United States Patent [19]

Draper et al.

[11] 4,159,518
[45] Jun. 26, 1979

[54] AUTO-SELECTION PRIORITY CIRCUITS FOR PLURAL CHANNEL ADAPTERS

[75] Inventors: Wilburn D. Draper, Raleigh; John D. Gentry, Roxboro; Michael T. Kawalec, Chapel Hill; Melvin T. Laakso, Cary, all of N.C.

[73] Assignee: International Business Machines Corporation, Armonk, N.Y.

[21] Appl. No.: 812,947

[22] Filed: Jul. 5, 1977

[51] Int. Cl.² .............................................. G06F 3/04
[52] U.S. Cl. .................................................... 364/200
[58] Field of Search ... 364/200 MS File, 900 MS File

[56] References Cited

U.S. PATENT DOCUMENTS

| 3,581,286 | 5/1971 | Beausoleil | 364/200 |
| 3,706,974 | 12/1972 | Patrick et al. | 364/200 |
| 4,038,641 | 7/1977 | Bouknecht et al. | 364/200 |

OTHER PUBLICATIONS

Grant et al., "Priority Interrupt Queuing", IBM TDB, vol. 15, No. 10, Mar. 1973, pp. 3046–3048.

Primary Examiner—Gareth D. Shaw
Assistant Examiner—Thomas M. Heckler
Attorney, Agent, or Firm—John B. Frisone

[57] ABSTRACT

In data processing systems of the type having a plurality of terminals connected by communication lines to a commmunications controller (CC) which assembles and manipulates the data from or to the terminals and one or more host central processing units (CPU's) to which the CC is connected by a number of channels, the CC will usually have a channel adapter unit (CA) for each channel and a processing unit to control the operations of the CC and to service the CA's in turn. It is necessary that the CA's be serviced with proper priorities to avoid unnecessary loss of information. An allocation of the proper priority is required where each CA can perform tasks of different urgency.

The CC shown has four channel adapters communicating with four channels of the CPU's. All CA's can signal for an interrupt of the processor in the CC when CA service is needed. All CA's cause processor interrupts on the same interrupt level. A built-in priority allocation system will select for service that CA which wants to perform the task of highest priority among those CA's which are ready to perform a task. In the case of several requests of equal priority, a tie-breaking system comprises a loop circuit connecting all adapters and a signal sent in one direction around the loop from the last serviced adapter to select the next adapter which will be serviced.

6 Claims, 5 Drawing Figures

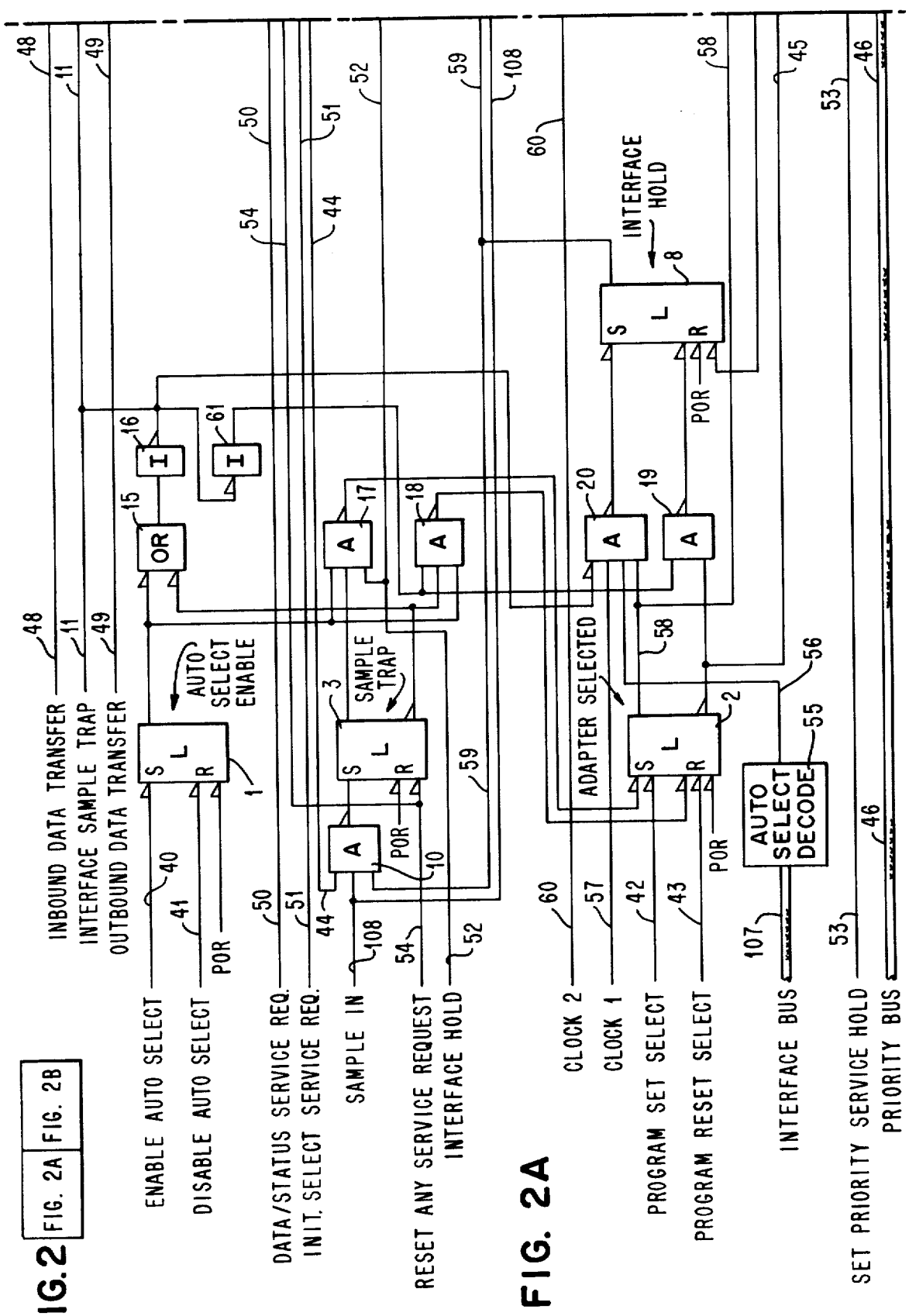

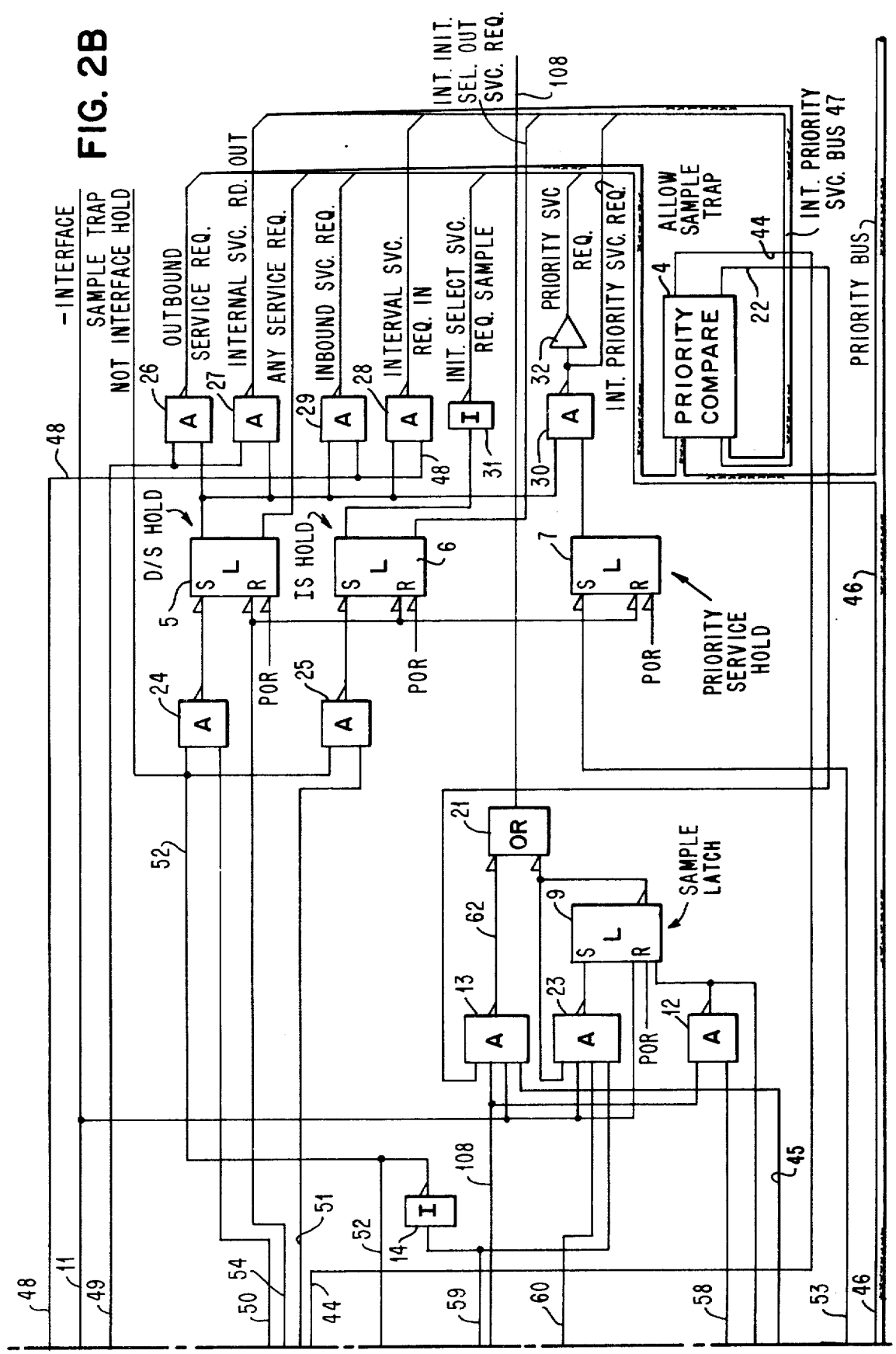

AUTO-SELECTION PRIORITY CIRCUITS FOR PLURAL CHANNEL ADAPTERS

OBJECTS OF THE INVENTION

This invention relates to a communications controller (CC) or multiplexor for a data communication system and, more particularly, to a priority system in such a CC for selecting, in order of priority, the channel adapters of the CC for data transfers or other services.

Previously, a large number of adapters, each having assigned to it only one priority level of a number of levels, are arranged in groups of the same priority and compete among themselves in each group for service with the highest priority group being serviced first for all of its units before any unit in another group is given access to the servicing system. This system is not acceptable for multiple channel adapters where each adapter can perform a number of tasks of different priorities. A priority allocation system which takes account of the actual level of service needed by each of the adapters, is required.

It is then an object of this invention to devise a priority structure for a group of interconnected channel adapters with each adapter being capable of performing several tasks of differing degrees of priority wherein servicing of the adapters will be done in the order of priority of the tasks pending at that time.

Another object is to provide a group of adapters with an interconnecting priority system such that each adapter can compare its need for service and the priority level of its need with those of other adapters to determine which adapter has the highest priority and is to be serviced first.

Still another object is to develop a priority system for adapters capable of a number of distinct operations having different priority requirements wherein the adapters communicate among themselves to determine which adapter needing service has the highest priority and is, among those having the highest priority, next in sequence to the last active adapter.

Other objects and features of novelty will be particularly pointed out or be obvious in the following more particular description and appended drawings of a preferred embodiment of the invention.

In the drawings:

FIG. 2 shows how FIGS. 2A and 2B are related;

Figure 3:
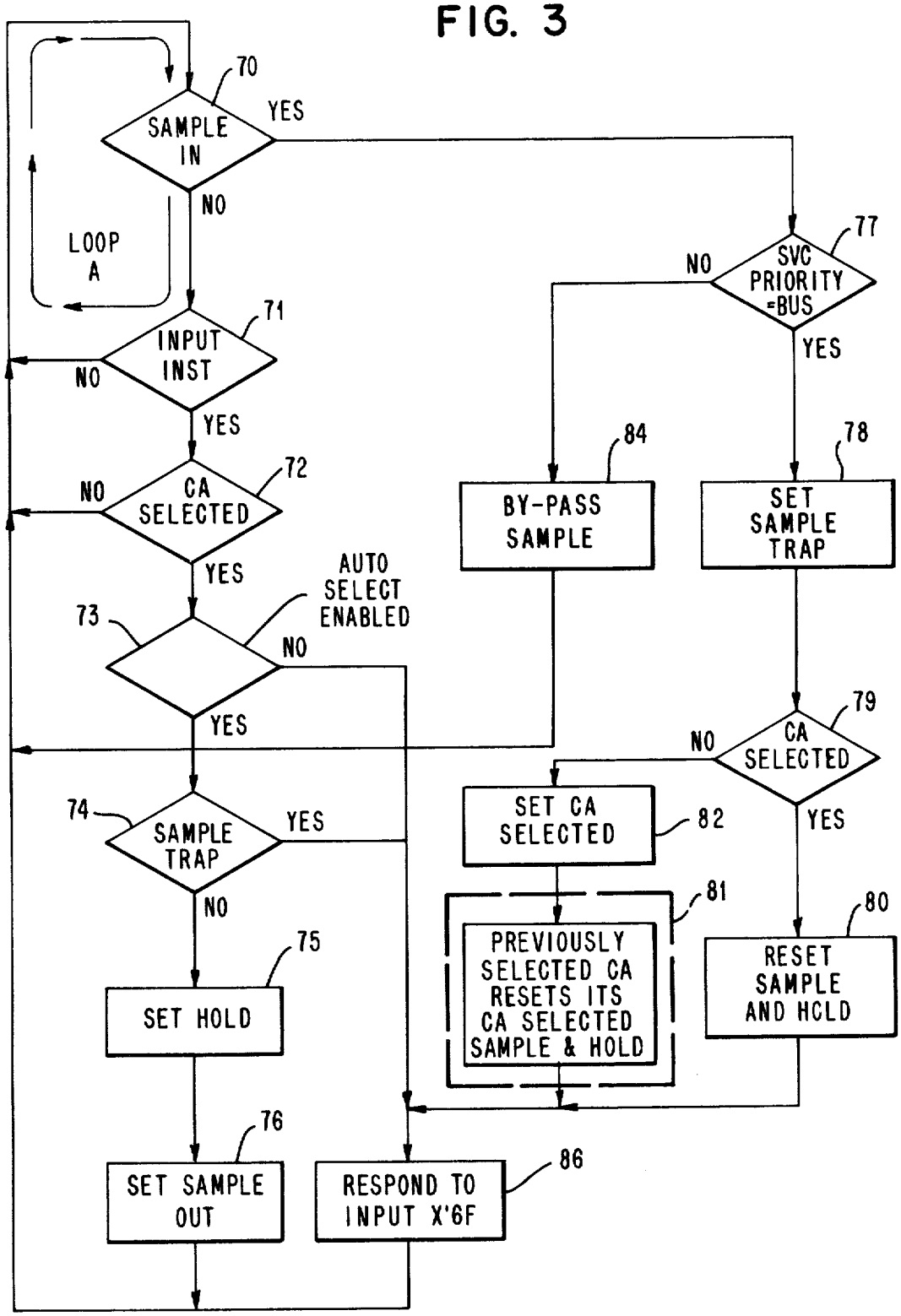

FIGS. 2A and 2B, when combined, form a circuit diagram showing the components and their interconnections of the priority control structure of a channel adapter; and FIG. 3 is a flow chart showing the sequence of operation of the circuit of FIG. 2.

PRIOR ART

The early communication controllers were designed to connect terminals on a number of transmission lines to a single or, at best, a pair of alternately connectable central processing units (CPU's) via a channel adapter (CA) connected to each CPU. This type of structure is exemplified in assignee's U.S. Pat. No. 3,735,357, issued May 22, 1973, to A. W. Maholick et al and entitled, "Priority System for a Communication Control Unit." Such a CC is commercially available as assignee's Model 3705 machine. In those machines, there is no need for priority control over the channel adapters for only one is active at any given time.

In the development of larger systems, it became necessary for a terminal to communicate with a number of application programs in one or more CPU's and a channel adapter is needed for each such application. These adapters will usually all be operative concurrently and current implementations of the CC operating program have used different levels of processor interrupt to select among the CA's for priority servicing. Another previous implementation was to use the processor program to test the CA's to determine which is most in need of servicing. The first implementation uses too many of the available interrupt levels of the processor and the second uses too much time and too much program storage for them to be satisfactory implementations of channel adapter selection circuits.

The herein described embodiment provides structure in the CA's to enable them to decide among themselves which one is to be serviced first and uses only one interrupt level in the processor to service all channel adapters.

PREFERRED EMBODIMENT

Figure 1:
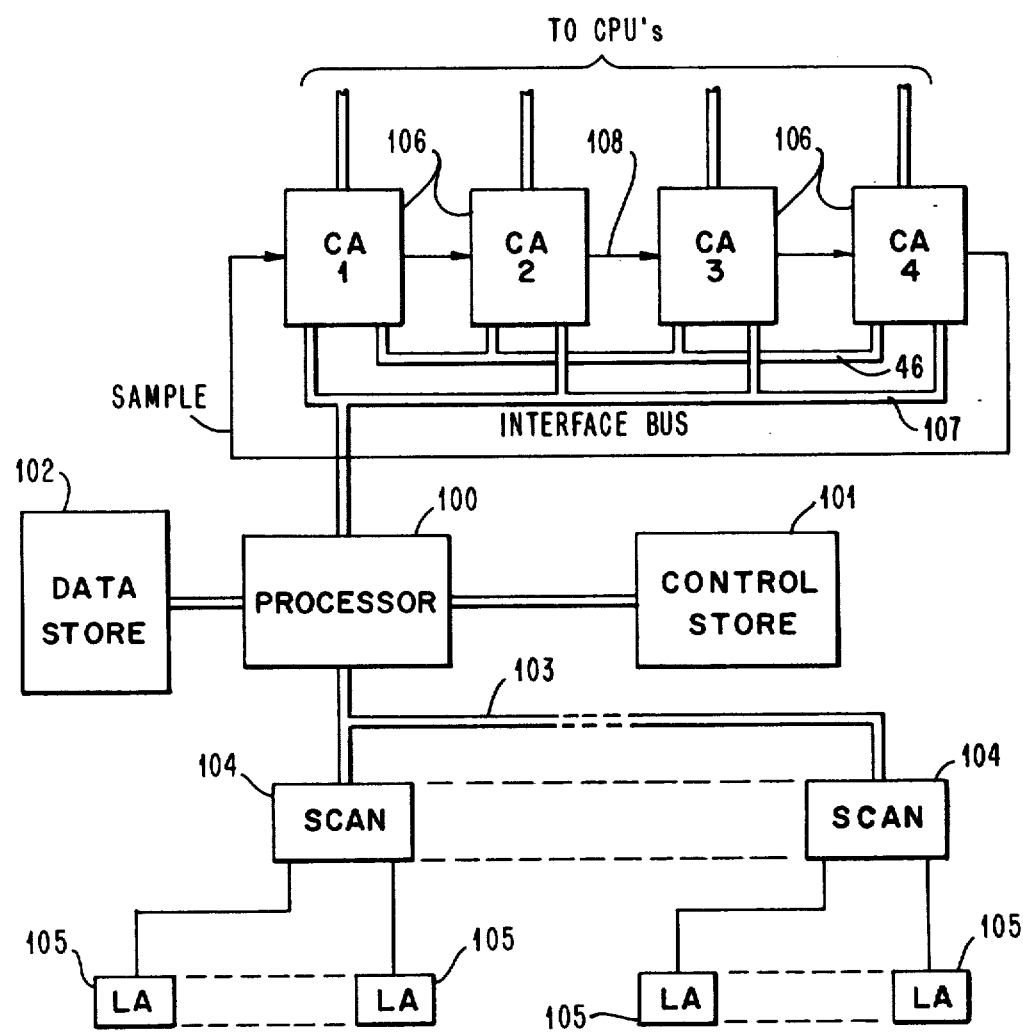
FIG. 1 is an overall schematic of the central controller showing the site of the invention and the associated adapters.

A generalized diagram for the communications controller (CC) is given in FIG. 1. A specialized processor 100 is connected to a control store section 101 of a storage unit, which contains the control programs for the processor, and to a data store section 102 for accumulation and temporary storage of data passing through the unit. The processor 100 will be connected by a bus 103 to a plurality of scanner units 104 with each scanner 104 servicing a number of line adapters or modems 105. In the embodiment of such a CC in commercial use, the processor will control the transfer of data between the line adapters 105 and the data store 102.

The processor 100 under control of programs in store 101 will also control the transfer of data from data store 102 to the attached CPU's through channel adapters 106. All channel adapters (CA) 106 are connected to the processor 100 over a common interface bus 107. The CA's will each contain buffer registers, address recognition circuits and sufficient control circuits settable under control of the processor 100 to supervise the data transfers and to notify the processor 100 of the CA status at any time. The processor will start a CA on a particular task and will thereafter periodically check the progress of the CA's to see if any further action is needed.

As two or more of the CA's 106 may be functioning at the same time, it is possible that there may be a simultaneous demand for the services of the processor 100. Previously, these demands have been taken in sequence but as the CA's can perform different tasks of varying degrees of urgency, the sequential scheme leads to an overall performance degradation and can lead to loss of data by postponing an urgent need in a CA. In the following description of a preferred embodiment of our invention, only the priority control circuits shown in FIG. 2 are added to the prior structure and need to be further described.

DETAILED DESCRIPTION

The channel adapters 106 may be controlled in either of two modes: a central controlled mode in which each CA 106 is individually contacted and controlled over interface bus 107; or a priority mode in which the processor makes a general poll of the adapters and the ready CA with first priority will answer the poll.

In the priority control circuits FIGS. 2, 2A and 2B of each CA 106, an Auto Select Enable latch 1 controls the priority circuits and all Auto Select Enable latches 1 can be set by a common Enable Auto Select line 40 or can be reset buy a common Disable Auto Select line 41 in interface bus 107 (FIG. 1). When latch 1 in each CA is set, the priority circuits are enabled. A second latch 2, the Adapter Selected latch, can be set under control of a line 42 in interface bus 107 to select one CA directly or can be reset by a signal on the interface line 43. The latch 2 can also be set and reset by signals from the priority circuits when auto selection is in progress to ultimately select the next CA for servicing.

All of the CA's 106 are connected in a sample loop circuit 108 (FIG. 1) which passes control from a lower numbered CA to a higher numbered one and from the highest one to the lowest numbered CA. In each CA 106 there is a Sample Trap latch 3 which can be set by the incoming Sample line 108 through an AND circuit 10. AND 10 is gated by a Priority Compare circuit 4 via an Allow Sample Trap line 44 so that an incoming sample signal on lead 108 will set the latch 3 when the CA is requesting service at the highest active priority level. Setting of the latch 3 will enable the CA 106 to set its Adapter Selected latch 2 which will signal the processor 100 via line 45 of the ID of the CA which is ready for service. Energization of the Priority Compare circuit 4 will also drop the voltage level on a negative logic lead 22 which will inhibit an AND circuit 13 to block passage of the signal on the Sample-in line 108 to the Sample-out line. If the priority of the Ca does not at least equal that of other CA's 106, the voltage of lead 22 is at a high level and the Sample-in signal will propagate through AND 13 and OR 21 to the Sample-out line 108.

The Priority Compare circuit 4 receives the service requests on a priority bus 46 common to all CA's 106, see FIG. 1, which carries the requests from all of the CA's and the priority request from its own internal service bus 47. The requests are compared and if the internal request on bus 47 is equal to the highest priority request on bus 46, the Allow Sample Trap signal on lines 44 and 22 is activated. The internal service requests are received from the other portions of the CA over a line 48 when an inbound data transfer is requested, on line 49 when an outbound data transfer is requested and on a line 50 when a request is made for either data service or a status service. An Initial Select request line 51 is activated when service is needed to start an initial section for a channel adapter services. An Interface Hold line 52, common to all CA's, is activated when the priority status of the CA's 106 is to be tested and this will freeze the state of all CA's priority request circuits. If a data/status service request has activated line 50 when the Interface Hold line 52 (tied together from all CA 106 of the outputs of circuits 14) activates, AND 24 passes a signal to the set input of a D/S Hold latch 5 or, if the initial select service line 51 is activated when line 52 is activated, AND 25 will pass a signal to the set input of an Initial Service Hold latch 6. A request to hold a priority setting on the set priority hold via output line 53 will set the Priority Service Hold latch 7. Each of the latches 3, 5, 6 and 7 will be reset by the processor 100 when the channel adapters are serviced by a signal on the Reset Any Service Request line 54 which goes to the reset input of each of these latches 3, 5, 6 and 7.

When D/S Hold latch 5 is set, AND circuits 26 and 27 are gated to pass a signal on the outboard data transfer line 49 to the priority bus 46 and to the internal priority bus 47, respectively. Also, AND's 28 and 29 are gated to pass a signal on the inbound data transfer line 48 to the internal priority bus 47 and the priority bus 46, respectively. AND 30 will be activated by the setting of the D/S Hold latch 5 and the Priority Service Hold latch 7 to put a signal on the internal priority bus 47 and through an isolation circuit 32 to put a signal on the priority bus 46. Latch 6, when set, will put a signal from its negative logic output onto internal bus 47 and from its positive logic output a signal is passed through an inverter 31 to the priority bus 46. As noted above, these priority signals are compared to activate the Allow Sample Trap signals on lines 44 and 22, if the internal priority is as high as any on priority bus 46.

When the processor 100 has serviced the CA's 106, it resets the latches 3, 5, 6 and 7 in all CA's by activating the Reset Any Service Request line 54. The processor 100 may thereafter initiate an auto selection sequence by putting a specific coded signal on a part of interface bus 107. This signal is decoded by an Auto Select Decode circuit 55 which puts a signal on a line 56. This signal on line 56 together with the Clock 1 signal on line 57, the not Interface Sample Trap signal from invertor 16 (set by the reset condition of latch 1 or the set condition of latch 3) and the set condition signal on line 58 from the adapter selected latch 2 will set the Interface Hold latch 8. The setting of latch 8 will raise the level of its output line 59 to enable the AND 10 for the sample trap latch 3 and an AND 23 for a Sample latch 9. The signal on line 59 will be inverted in inverter 14 to drop the voltage on the Interface Hold line 52 thereby preventing further changes in the state of latches 5 and 6 and of gates 17 in all CA's to prevent a setting of any of the Adapter Selected latches 2 through AND's 17. At this stage, the priority requests of all CA's 106 have been frozen and no change will be allowed in the states of the Adapter Selected latches 2.

After a pause to enable the circuits to settle to a final condition and the Priority Compare circuit 4 to prime the AND 10 for the Sample Trap 3 of each adapter which is requesting service at the highest active priority level, the Clock 2, line 60, is raised to AND 23 and since all of the other inputs to AND 23 in the selected CA are active at this time, Sample latch 9 in that CA will be set. Its inverted level output will drop in signal level to thereafter inhibit AND 23 and will pass a signal through OR 21 to the Sample-out line 108 which is the Sample-in line of the next CA 106 in the sequence.

If the CA 106 receiving a Sample-in signal on line 108 does not have sufficient service priority to be serviced at this time, its AND 10 for its Sample Trap 3 is inhibited so the latch 3 will not be set. However, line 22 is at an active level so that AND 13, also receiving high level inputs from the Sample-in line 108, the Auto Select Enable latch 1, and the Interface Hold latch 8 will pass the Sample-in signal over line 62 to OR 21 to the CA's Sample-out line 108 and to the next CA 106. In this way, the Sample Trap latch 3 will be set in only the next sequential CA 106 which has a priority equal to the highest priority need of all the CA's and the Sample signal will not be passed to any CA's later in the sequence.

If the Sample-out signal from a selected CA 106 is passed through all of the outer adapters 106 which do not need service or have a lower priority than the selected one back to the originating CA, it will reset its Interface Hold and Sample latches 8 and 9, respectively, by AND 12 which receives a high level signal from the Adapter Selected latch 2 and the returned Sample signal on line 108 to energize the reset inputs of latches 8 and 9. If, however, the Sample signal is intercepted by another CA 106 which sets its Sample Trap latch 3, the Adapter Selected latch 2 in the previously selected CA 106 is reset through AND 18 which receives the high level signal from the negative logic output of its unset Sample Trap latch 2, the set output of the Auto Select Enable latch 1 and the Interface Sample Trap signal (negative when any latch 3 is set) and inverted by inverter 61 to put a reset signal into latch 2. When latch 2 resets, the high level signal on its negative logic output and the high level output of inverter 61 are combined in AND 19 to reset the Interface Hold latch 8. The Sample latch 9 will be reset whenever the output of Interface Sample trap line 11 (from an activated inverter 16 in the CA 106 having its Sample Trap latch 3 set) is brought to a lower level. When the latch 8 is reset, the output of inverter 14 goes to a high level so that AND 17 in the CA 106 which has its Sample Trap 9 set receives all high inputs and will put a signal to the set input of its associated Adapter Selected latch 2. This will put a signal on line 45 to the processor 100 to indicate the CA which is to be serviced. When processor 100 has completed servicing the selected adapter and is ready to make another poll of the CA's, the above sequence will be repeated.

The above description is summarized on the flow chart of FIG. 3. In each adapter, after receipt of the Reset Any Service Request signal on line 54, the adapter priority circuits will be idle with the Sample-in line 108, block 70, inactive and with no polling instruction on interface bus 107, block 71, as is indicated by loop A. Upon receipt of the polling instruction, block 71, the selected CA 106, block 72, will check the state of the Auto Select Enabled latch 1, block 73. The other CA's will continue to idle (the No output of block 72 returns to the origin). If the Auto Select Enabled latch is not set, the selected CA 106 will respond to the instruction, block 86, but, if the Auto Select Enabled latch 1 is set, block 73, and a Sample Trap 3 is not set, block 74, the selected CA will first set its Interface Hold latch 8, block 75, to freeze service requests in latches 5 and 6 thereby freezing the inputs to the Priority Compare circuit 4 and bring up the Allow Sample Trap signal if the adapter's priority is equal to the highest priority on the bus. The selected adapter will then set the Sample latch 9, block 76, to send a Sample signal to the next adapter and will return to an idle condition.

The next CA 106 in the priority sequence will receive the Sample signal, block 70, and if it does not have its Allow Sample Trap signal activated (No output of block 77) it will bypass the Sample signal to the next CA in sequence, block 84, and will continue in the idle condition. If the CA receiving the Sample signal does have an equal priority (Yes output of block 77) it will set its Sample Trap latch 3, block 78, and the Sample signal will not be further propagated so that no other CA will be selected. The newly selected CA will then set its CA Selected latch 2, block 82, and will respond to the polling instruction, block 86. In the previously selected CA 106, when a Sample Trap latch is set in another CA, the Interface Sample Trap signal from inverter 61 and AND 18 will reset the previously set Adapter Selected latch 2 and this resetting will reset the previously set Interface Hold and Sample latches 8 and 9, block 81. If the Sample signal is bypassed around the CA priority loopback to the initiating CA, it indicates that no other CA has as high a priority request. The selected CA, block 79, will then reset its own Interface Hold and Sample latches 8 and 9, block 80, ready for the next polling sequence and will make its response to the polling signal, block 86.

It will thus be seen that while the processor can be programmed to initiate operations in any CA, when the CA's are in an auto select mode, the last selected CA will in response to a poll request, initiate a Sample signal which will be passed through all of the CA's in sequence until it is received by the first CA in the sequence which has a priority equal to or greater than the other CA's. This CA will thereby be selected and will make a response to the processor to start, end, or continue a CA data transfer. The last selected CA need not have been selected in an auto select type operation since latch 2 can be set directly by processor 100 to start a polling sequence.

The above description of a preferred embodiment of our invention is not to be taken as limiting the scope of the invention as substantial changes in structure are possible without departing from the invention as set out in the following claims.

What is claimed is:

1. In a communications controller for controlling data transfers between a plurality of modem circuits and a number of simultaneously operating virtual processing units with said communications controller including a channel adapter for each virtual processing unit, the combination of:
   a priority bus common to all channel adapters;
   interface control circuits common to said channel adapters;
   a sample circuit having an input, a sample trap latch and an output in each channel adapter;
   connections between each sample circuit output and another sample circuit input to connect said channel adapters into a single loop; and
   a priority control circuit in each channel adapter, said priority control circuit comprising:
      an adapter selected latch settable in only one of said channel adapters;
      a plurality of priority request circuits;
      a poll initiate circuit operable in conjunction with the set one of said adapter selected latch to put a priority hold signal on one of said interface control circuits;
      means responsive to said priority hold signal to store the states of said priority requests circuits;
      connections between said storing means and said priority bus to transfer said stored states to corresponding circuits in said priority bus;
      a comparison circuit to compare the requested priority with the highest priority on said priority bus to prime said sample trap latch in said sample circuit and to inhibit passage of a sample signal through said adapter if said priorities are equal; and
      a sample signal circuit thereafter activated by said poll initiate circuit to put a sample signal on the output of said sample circuit to set said sample trap latch in the first channel adapter in said sample loop which has its sample trap latch primed, any intermediate channel adapters not having a primed sample trap acting to bypass an incoming sample signal to said sample circuit output.

2. A priority control circuit as set out in claim 1 and further characterized in that it includes:
- connections from said sample trap latch to one interface control circuit whereby a set sample trap latch will reset any set adapter selected latch, said poll initiate circuit and said sample signal circuit;
- a connection from a set sample trap latch to the adapter selected latch in its channel adapter to set said latch; and
- an output signal circuit from said set adapter selected latch to identify the channel adapter which has the first priority.

3. A priority control circuit as set out in claim 2 and further characterized in that it includes:
- a further circuit to inhibit the resetting of said adapter selected latch if said sample signal is bypassed by the intervening channel adapters around said sample signal loopback to said sample trap in the channel adapter having its adapter selected latch set; and
- another circuit primed by said set adapter selected latch to reset said poll initiate circuit and said sample signal circuit.

4. A priority circuit for a number of channel adapters simultaneously transmitting data between a communication controller and a like number of virtual data processing units, said priority circuit comprising:
- a plurality of service request lines of differing priority in each channel adapter;
- a settable latch for each service request line;
- a priority bus common to all said channel adapters;
- connection means from each said settable latch to said priority bus for energizing a bus circuit corresponding to the latch when it is set;
- priority comparing means to compare the priority requested when a settable latch of a channel adapter is set with the priority circuits energized on said priority bus and to activate an internal allow trap signal when said priorities are equal;
- a sample loop circuit interconnecting said adapters including a sample circuit at each said adapter having an input connected to the output of the sample circuit of a predecessor channel adapter on the sample loop circuit, an output connected to the input of the sample circuit of a subsequent channel adapter on the sample loop circuit and a normally effective bypass device to pass a sample signal from said input to said output;
- a sample trap connected to said input of said sample circuit to receive sample signals from said input;
- connections from said priority comparing means to said sample trap and said bypass device to enable said allow trap signal to prime said sample trap to become set upon receipt of a sample signal and to inhibit said bypass device; and
- a polling input to first activate in one channel adapter a hold signal for all channel adapters to set said latches for said priority requests to store the states of said priority requests and to thereafter activate said sample circuit to start an output signal from said one channel adapter.

5. A priority circuit as set out in claim 4 and further including:
- an adapter selected latch settable to indicate that the associated channel adapter is the one which is to be serviced and which acts, when set, with said polling circuit to activate said hold signal; and
- means controlled by said sample trap when set to set its associated adapter selected latch and to reset any previously set adapter selected latch, the activated hold signal, and the activated sample signal.

6. A priority circuit as set out in claim 5 and further characterized in that it includes:
- a circuit from any set sample trap to said adapter selected latch in the same channel adapter to maintain said adapter selected latch in the set condition and to reset only said activated hold signal and said activated sample signal.

* * * * *